UNITED STATES PATENT OFFICE.

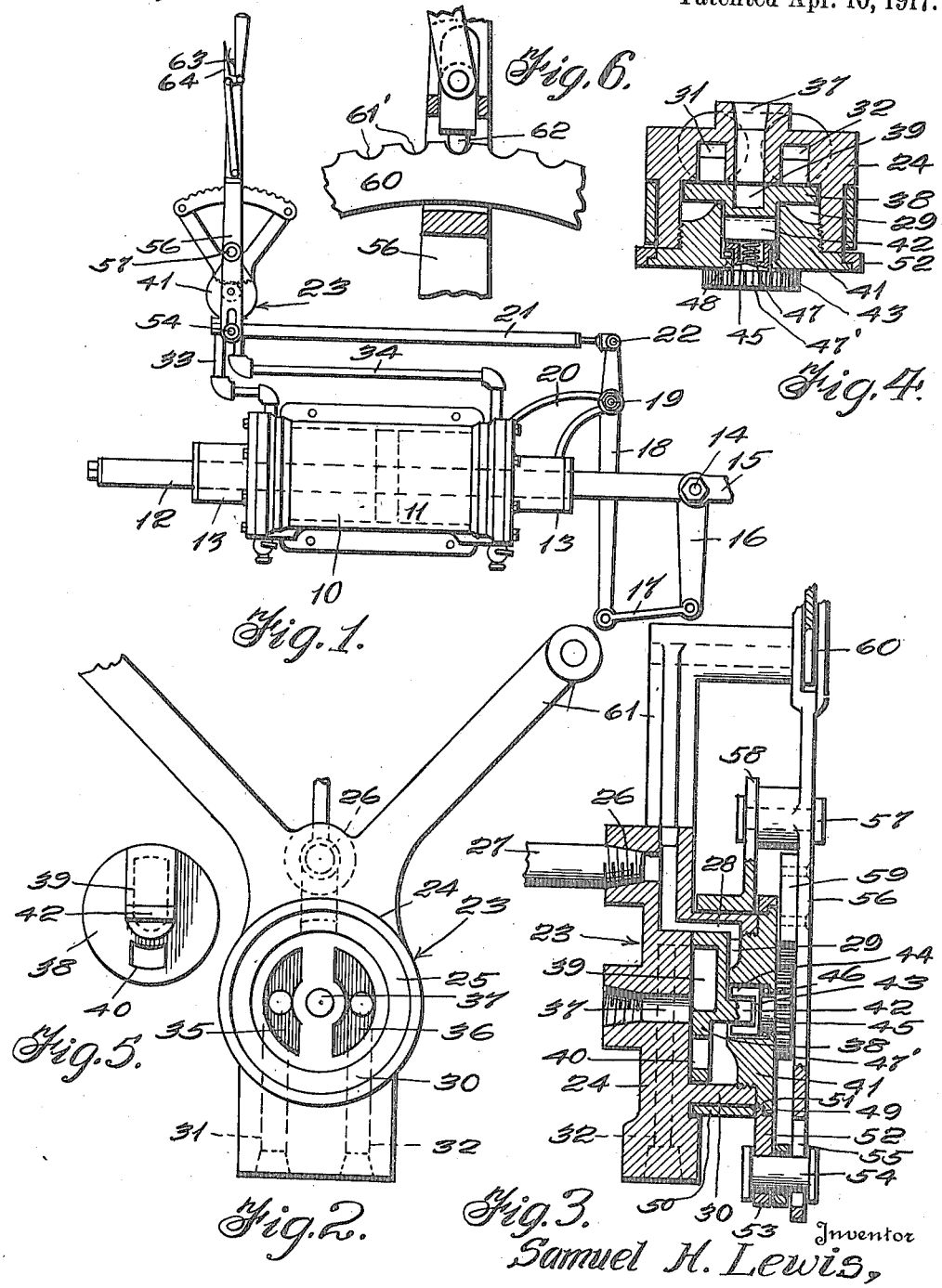

SAMUEL H. LEWIS, OF RICHMOND, VIRGINIA.

FLUID-PRESSURE-OPERATED VALVE-GEAR-SHIFTING MECHANISM.

1,221,876.    Specification of Letters Patent.    Patented Apr. 10, 1917.

Application filed January 10, 1917. Serial No. 141,686.

*To all whom it may concern:*

Be it known that I, SAMUEL H. LEWIS, a citizen of the United States, residing at Richmond, in the county of Henrico and State of Virginia, have invented certain new and useful Improvements in Fluid-Pressure-Operated Valve-Gear-Shifting Mechanism, of which the following is a specification.

My invention relates to improvements in fluid pressure operated apparatus for operating or shifting the valve gear of steam engines, particularly railway locomotives, while not necessarily restricted to this use.

The invention aims to provide a construction which is extremely simple, inexpensive to manufacture, reliable in operation, and adapted to effect a fine adjustment of the valve gear.

In my prior Patent No. 1,183,213, I have shown a pressure operated valve gear mechanism embodying a combination lever, connected at its lower end with a rod extending forwardly for connection with the piston rod. At its upper end this combination lever has pivotal connection with a manually operable lever, which is pivoted upon the valve casing. Between its ends, the combination lever is suitably connected with the valve of the valve mechanism, for operating it.

It has been found that the combination lever complicates the construction, besides increasing the cost of manufacture and preventing a fine adjustment of the valve gear. To overcome these disadvantages, I have devised the present construction, wherein the combination lever is wholly dispensed with. In this construction, the manually operated lever is pivoted at its lower end to the reach rod extending to the piston rod and its upper end is adapted to be locked to the stationary quadrant, in a manner to permit the manually operated lever to swing upon the quadrant as an upper pivot. The valve of the valve mechanism is connected with the manually operated lever between its ends. When the manually operated lever is swung in one direction the valve will be turned for introducing pressure into the corresponding end of the cylinder, and when the piston moves, the automatic means operates to shift the lower end of the manually operated lever, which then turns upon its upper pivot, for closing the valve.

In the accompanying drawings forming a part of this specification, and in which like numerals are employed to designate like parts throughout the same, Figure 1 is a side elevation of apparatus embodying my invention.

Fig. 2 is a side elevation of a valve casing, parts being removed.

Fig. 3 is a central vertical sectional view through the valve structure or mechanism.

Fig. 4 is a horizontal sectional view taken on line 4—4 of Fig. 2,

Fig. 5 is a side elevation of a control valve, and,

Fig. 6 is a detail section through the quadrant and latch mechanism.

In the drawings, wherein for the purpose of illustration is shown a preferred embodiment of my invention, the numeral 10 designates a preferably horizontally arranged cylinder, which is secured to the locomotive at any suitable point. Mounted to reciprocate within this cylinder is a piston 11, rigidly secured to a piston rod 12, operating through stuffing boxes 13. Pivotally connected with the forward end of the piston rod 12, as shown at 14, is a pitman or link 15, having suitable connection with the valve gear of the locomotive, to shift it.

Rigidly connected with the forward end of the piston rod 12 is a depending crank 16, having its lower end pivotally connected with a link 17, pivotally connected with the lower end of a preferably vertically swinging lever 18. The lever 18 is pivotally connected between its ends, as shown at 19, with an arm or bracket 20, rigidly secured to the cylinder 10.

Pivotally connected with the upper end of the lever 18 is a reach rod 21, as shown at 22.

The numeral 23 designates a valve structure or mechanism as a whole, comprising a casting 24, having a flat face 25, and provided with an inlet port 26, having communication with a pipe 27, which leads to a source of pressure, such as a compressed air storage tank, not shown. The inlet port 26 has communication with an inlet port 28, discharging into a chamber 29, to be hereinafter referred to. The inlet port 28 passes through the annular flange 30, formed upon the casting 24, as shown. Arranged upon the opposite sides of the inlet port are ports 31 and 32, which lead into pipes 33 and 34, discharging into the opposite ends of the cylinder 10. The ports 31 and 32 have their upper ends discharging into segmental grooves 35 and 36, arranged upon opposite sides of the inlet port, as shown. The numeral 37 designates an exhaust port, extending through the face 25 of the casting and disposed between the grooves 35 and 36. Disposed to rotate or turn within the flange 30 in slidable contact with the face 25 is a valve 38, having its inner side provided with a surface groove or port 39, the inner end of which is in permanent registration with the exhaust port 37, while its outer end is adapted to be alternately moved into registration with the grooves 35 and 36. The valve 38 is provided in its lower portion with a transverse port or opening 40. This transverse opening 40 is arranged between the segmental grooves 35 and 36, and when the valve 38 is in the normal position, the opening 40 preferably has its ends arranged in line to line relation with the grooves 35 and 36, whereby a leakage of pressure is permitted into the grooves 35 and 36, such pressure passing to the opposite ends of the cylinder 10, to normally retain the pressure equal upon opposite sides of the piston. The chamber 29 is disposed between the valve 38 and a head 41, which closes the chamber. The pressure from the port 26 thus circulates upon the top of the valve 38, which serves to retain it securely seated.

The valve 38 is provided with a post 42 for turning it, which is rectangular in cross-section and adapted to fit within an opening 43, formed in the head 44 of a stud 45. The head 44 is adapted to contact with a washer 46, and a compressible coil spring 47 is arranged between the post 42 and the end wall of an opening 48 formed in the stud 45, thus serving to hold the valve 38 upon its seat and the head 44 in contact with the ring or washer 46, for preventing leakage.

The head 41 is provided with a flange 49, forming with a ring or collar 50, an annular groove 51, for receiving a suspension collar or strap 52. This suspension collar or strap is provided at its lower end with a depending apertured guide 53, carrying a pivot element 54. The reach rod 21 has its rear end apertured for receiving a pin 54, whereby it is pivotally connected with the knuckle.

The pin 54 extends outwardly beyond the reach rod into a longitudinal opening or slot 55, formed in the lower end of a vertically swinging manually operated shifting lever 56. This shifting lever is pivotally connected, as shown at 57, with a swinging guide 58, preferably cast integral with the ring 50. The function of this guide is to retain gears, to be described, in proper engagement.

A toothed segment or gear 59 is bolted or otherwise rigidly secured to the shifting lever 56 and this segment engages a pinion 47', to turn the same. The pinion 47' is rigidly secured to the stud 45.

The manually operated shifting lever 56 operates in proximity to a stationary toothed quadrant 60, rigidly secured to the upper ends of arms 61, formed integral with the casting 24. This stationary quadrant is provided with recesses or notches 61', which are curved in cross-section, as shown, for pivotally receiving the lower end of a reciprocatory latch bolt 62, carried by the upper portion of the lever 56. The bolt is urged downwardly by a spring 63, and is elevated by a hand grip 64. It is thus apparent that I provide a pivotal latch or lock for the lever, to wit, a latch which will prevent the shifting of the lever longitudinally of the quadrant, and allow the lever swinging upon the bolt 62, as a pivot.

The operation of the apparatus is as follows:

When the shifting lever 56 is in the neutral position, the valve 38 is in the neutral or normal position, whereby the ends of the admission port 50 are arranged in substantial line to line relation with the lower ends of the grooves 35 and 36. There is then a passage of leakage of fluid pressure from the opening or port 40 into the grooves 35 and 36, which is conducted by the pipes 33 and 34, to the opposite ends of the cylinder 10, upon opposite sides of the piston 11, thus equalizing pressure upon the opposite sides and tend to hold the piston against movement. When it is desired to shift the valve gear to drive the locomotive forwardly, the shifting lever 56 is moved forwardly. As the reach rod 21 is now stationary, the lever 56 will turn upon its lower pivot, and through the medium of the gears, turn the valve 38 clockwise. This clockwise movement of the valve moves the port 40 into registration with the segmental groove 35 and out of registration with the segmental groove 36, the exhaust port 39 being simultaneously moved into registration with the groove 36. It is thus apparent that pressure will pass through the port 26, port 28, chamber 29, opening 40, pipe 31, pipe 33, into the left end of the cylinder and will exhaust from the opposite end of the cylinder through the pipe 34, port 32, groove 36, port 39, and through port 37 to the atmosphere. The pressure upon the rear or left side of the piston moves it forwardly. This movement of the piston is transmitted to the rod or pitman 15, which shifts the valve gear. Upon the forward movement of the piston rod 12, the crank 16 is moved forwardly, swinging the lower end of the lever 18 forwardly and its upper end rearwardly. The rearward movement of the upper end of the lever 18 is transmitted to the reach rod 21 and by it to the manually operated lever 56. The latch means being in engagement with the quadrant, the upper portion of the lever 56 cannot be shifted longitudinally of the quadrant but is free to turn thereon as a pivot. The lever 56 will therefore turn upon its upper pivot and its lower end will be moved rearwardly, thus returning the valve 38 to the neutral position.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having thus described my invention, what I claim is:

1. In apparatus of the character described, the combination with a cylinder, of a piston mounted to reciprocate therein, means for connecting the piston with the valve gear of a steam engine, valve mechanism for controlling the inlet and exhaust of fluid pressure to and from the opposite ends of the cylinder, a manually operated shifting lever connected with the valve mechanism for actuating the same, means connecting one end portion of the lever with the piston, a stationary quadrant arranged in proximity to the other end portion of the lever, and means for locking the last named end portion of the lever with the stationary quadrant so that such end portion cannot move longitudinally of the quadrant and providing a pivot upon which such lever is adapted to turn.

2. In apparatus of the character described, the combination with a cylinder, of a piston mounted to reciprocate therein, means for connecting the piston with the valve gear of a steam engine, valve mechanism for controlling the inlet and exhaust of fluid pressure to and from the opposite ends of the cylinder, a manually operated shifting lever connected between its ends with the valve mechanism for actuating the same, means connecting the lower end of the manually operated lever with the piston, a stationary quadrant arranged in proximity to the upper portion of the lever, and means for locking the upper portion of the lever with the stationary quadrant so that the lever cannot be shifted longitudinally of the quadrant and providing a pivot upon which the lever is adapted to turn.

3. In apparatus of the character described, the combination with a cylinder, of a piston mounted to reciprocate therein, means for connecting the piston with the valve gear of a steam engine, valve mechanism for controlling the inlet and exhaust of fluid pressure to and from the opposite ends of the cylinder, a manually operated shifting lever, connecting means between the valve mechanism and the manually operated shifting lever, a guide for the manually operated shifting lever having connection therewith between its ends, means connecting the lower end of the manually operated shifting lever with the piston, a stationary quadrant arranged in proximity to the upper end of the manually operated shifting lever, and means for locking the upper portion of the lever with the stationary quadrant so that the lever cannot be shifted longitudinally of the quadrant and providing a pivot upon which the lever is adapted to turn.

4. In apparatus of the character described, the combination with a cylinder, of a piston mounted to reciprocate therein, means for connecting the piston with the valve gear of a steam engine, a valve casing having means of communication with the opposite ends of the cylinder, a pivoted valve arranged within the valve casing, a manually operated lever arranged near the valve casing, a gear connected with the valve, a gear carried by the manually operated lever and engaging the first named gear, a guide pivotally connected with the valve casing and pivotally connected with the lever upon one side of the gear carried thereby, means connecting the lower end of the manually operated lever with the piston, a stationary quadrant arranged near the upper portion of the lever, and means for locking the upper portion of the lever with the quadrant so that the lever cannot be shifted longitudinally of the quadrant and providing a pivot upon which the lever is adapted to turn.

In testimony whereof I affix my signature.

SAMUEL H. LEWIS.